United States Patent [19]

Kucera

[11] 4,183,197
[45] Jan. 15, 1980

[54] MACHINE FOR FORMING LARGE ROUND BALES

[75] Inventor: Joseph B. Kucera, Traer, Iowa

[73] Assignee: Rudolph L. Lowell, Des Moines, Iowa ; a part interest

[21] Appl. No.: 943,472

[22] Filed: Sep. 18, 1978

[51] Int. Cl.² .......................................... A01D 75/00
[52] U.S. Cl. ...................................................... 56/341
[58] Field of Search ................................ 56/341–343, 56/1, 16.4

[56] References Cited

U.S. PATENT DOCUMENTS

| | | | |
|---|---|---|---|
| 3,110,145 | 11/1963 | Avery | 56/1 |
| 3,680,296 | 8/1972 | Beebout | 56/341 |
| 3,797,215 | 3/1974 | Kopaska | 56/341 |
| 3,815,344 | 6/1974 | Kucera | 56/341 |
| 3,979,892 | 9/1976 | Kucera | 56/341 |

*Primary Examiner*—Russell R. Kinsey
*Attorney, Agent, or Firm*—Rudolph L. Lowell

[57] ABSTRACT

The ground rolling machine for forming large round bales of a windrowed crop material has a rotatable material pickup device movably supported on a portable frame for movement relative to the rear end of the frame from a lower material pickup position to an elevated position wherein the formed bale can pass thereunder for discharge from the machine. A continuous flexible means movable in a generally upright path longitudinally of the machine is trained about the pickup device with a lower run extended between the pickup device and a bottom roller arranged forwardly of the pickup device at a position adjacent to the ground surface. As the portable frame is advanced along a windrow, the material gathered by the pickup device is rolled forwardly and engaged by the lower run of the belt means for compaction against the ground surface between the pickup device and the bottom roller. A transversely extended cradle unit pivoted on the machine forwardly of the bottom roller has a plurality of arcuately shaped transversely spaced bale supporting tines extended rearwardly and downwardly to positions beneath a bale being formed. The bale may be rolled in a supported position on the cradle unit, which on completion of the bale, may be elevated so that the bale is carried on the machine for transport purposes. The machine may be ground driven or operated from the power takeoff of a usual farm tractor.

8 Claims, 7 Drawing Figures

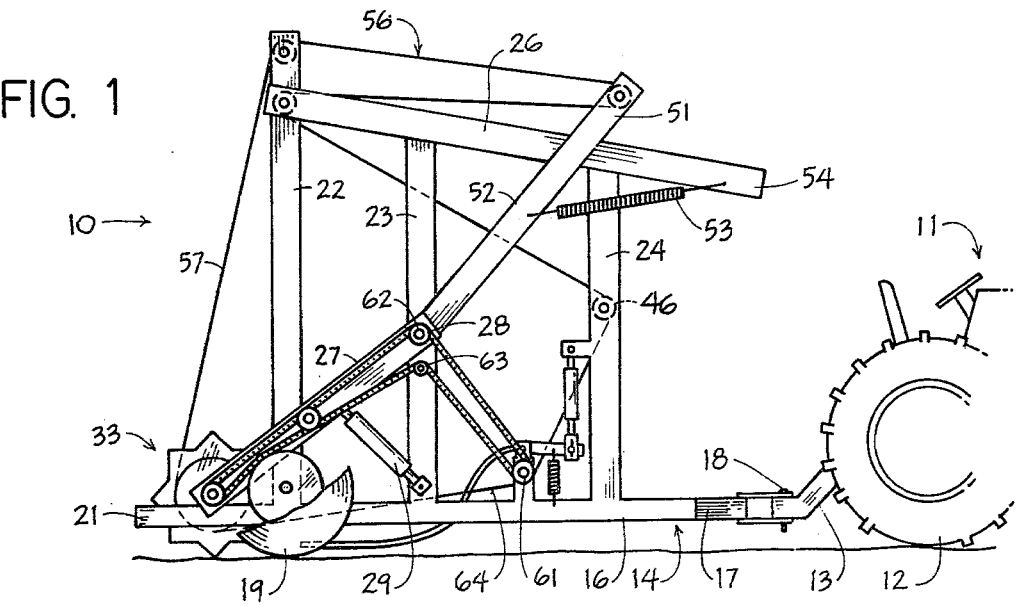
FIG. 1
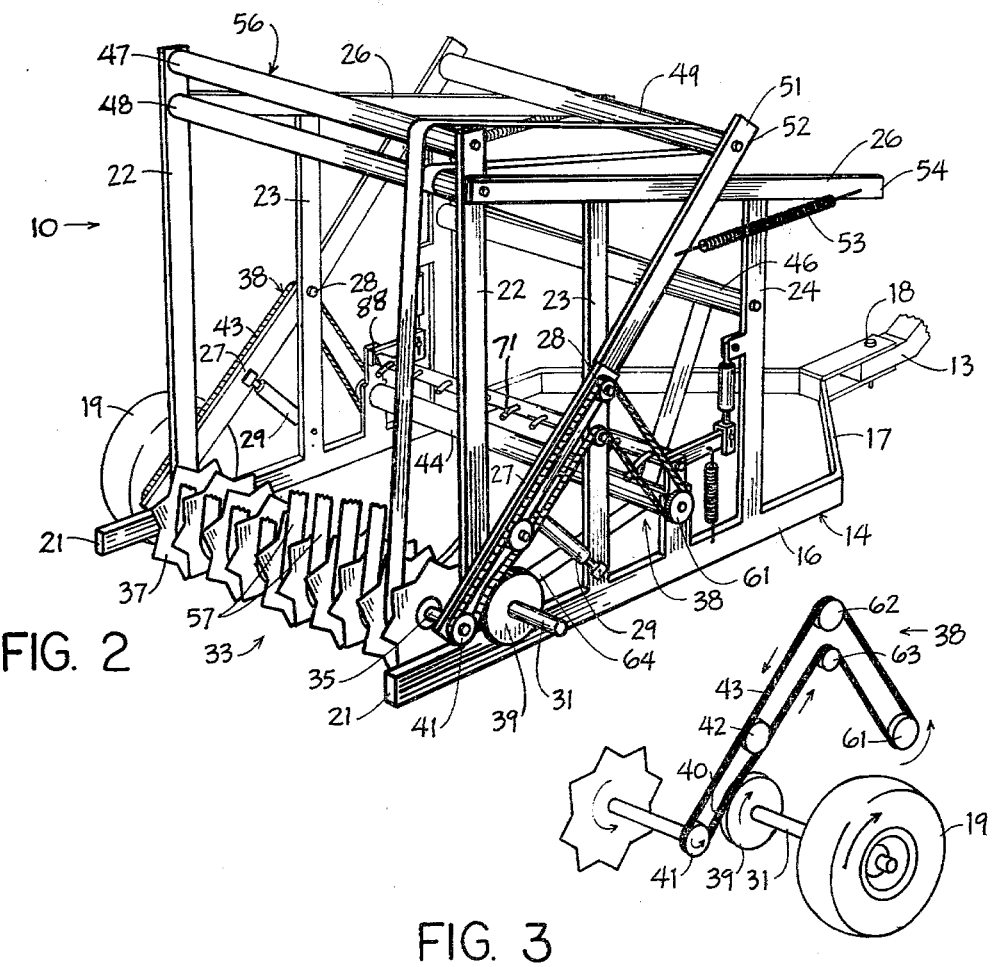
FIG. 2
FIG. 3

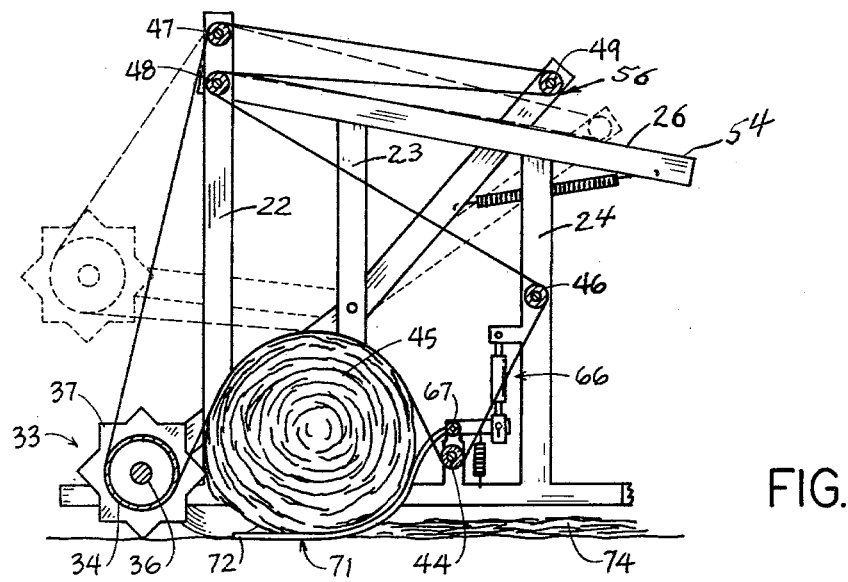
FIG. 4
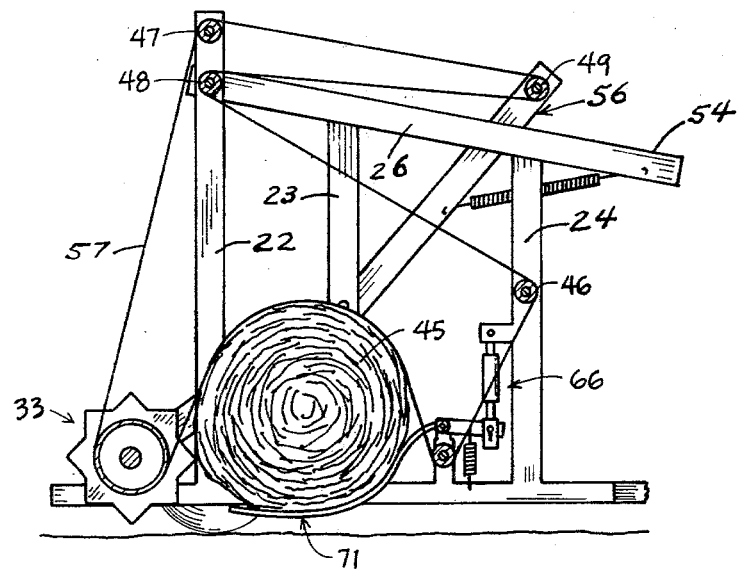
FIG. 5
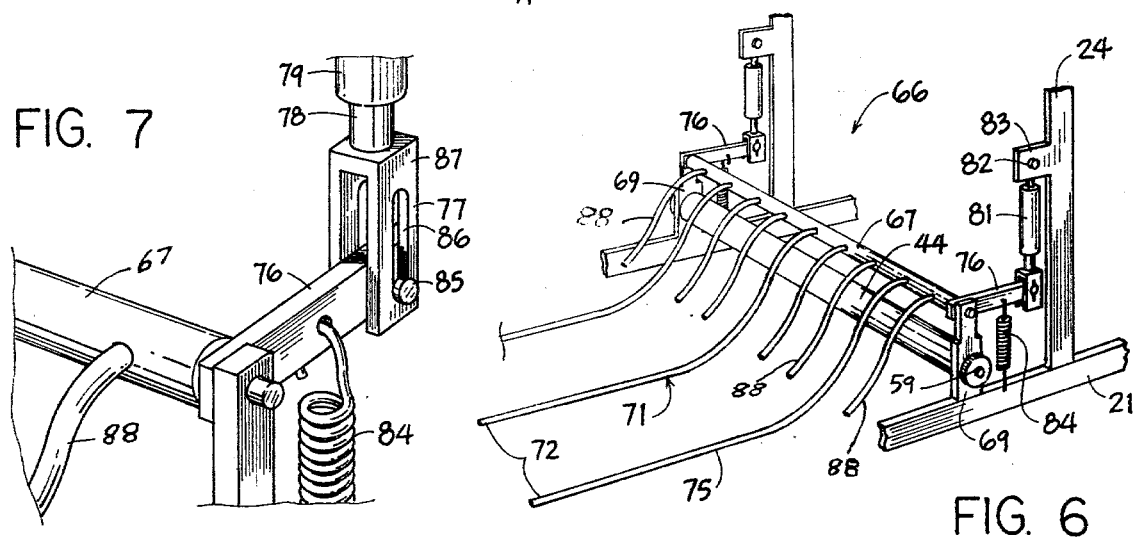
FIG. 7
FIG. 6

MACHINE FOR FORMING LARGE ROUND BALES

BACKGROUND OF THE INVENTION

Ground rolling bale forming machines are well-known in the art as evidenced by U.S. Pat. Nos. 3,110,145; 3,680,296; 3,797,215; 3,969,879; 3,979,892; 4,012,892 and 4,019,309. In the machines of these patents, the bale is in direct and continuous rolling engagement on the ground surface. As a result, the machine is incapable of transporting a formed bale to a storage or feeding location. When the machine is ground driven, as shown for example in U.S. Pat. Nos. 3,979,892; 4,019,309 and 3,110,145, ground wheel traction is appreciably reduced when the bale reaches a size such that it supports a portion of the machine weight which otherwise would be supported on the ground wheels. Also, with the bale being rolled along the ground surface, the ground drive wheels have a tendency to stall in a turn due to the inability of the outer or turning end of a bale being able to slip relative to the inner or stationary end thereof. All of these disadvantages of the prior art ground rolling machines are eliminated in the bale forming machine of the present invention.

SUMMARY OF THE INVENTION

The ground rolling bale forming machine is of a compact construction, efficient in operation and economical in cost and maintenance over a long service life. The size of the bale can be readily varied and, on being formed, may be transported on the machine to a desired location or discharged from the machine where formed. Rolling of the bale, while supported on the cradle unit at a position adjacent the top surface of the windrowed material, provides for a positive bale starting action regardless of the moisture content of the material to be baled. With the cradle unit in a yieldable riding engagement on the windrowed material, wind action tending to disrupt the flow of windrowed material to the pickup device is substantially reduced. Further, any loss of leaves from the material being baled is practically eliminated since the peripheral speed of the bale is substantially equal to the linear speed of travel of the towing tractor. Additionally, any leaves falling from the bale drop directly upon the windrowed material being gathered for reclamation within the bale being formed. The amount of compaction and, in turn, the density of the completed bale may be controlled by varying the yieldable pressure acting on the bale to continuously compact the bale while it is being formed. Importantly, when the machine is ground driven and with the bale supported on the cradle unit, the ground traction is progressively increased with an increase in bale size due to the weight of the bale being carried by the machine.

DESCRIPTION OF THE DRAWINGS

FIG. 1 is a diagrammatic side elevational view of the bale forming machine of this invention with portions broken away for clarity;

FIG. 2 is a perspective view of the machine with parts broken away to better show the arrangement thereon of the belt supporting rollers and the ground operated drive system;

FIG. 3 illustrates diagrammatically the ground operated drive system;

FIG. 4 is a side view of the machine with parts broken away to show a bale being formed;

FIG. 5 is illustrated similarly to FIG. 4 and shows the completed bale in a transport position on the machine;

FIG. 6 is an enlarged perspective view of the bale supporting cradle unit; and

FIG. 7 is an enlarged fragmentary detail perspective view of a rock arm and a hydraulic cylinder assembly that forms part of the cradle unit.

DETAILED DESCRIPTION OF THE INVENTION

Referring to FIG. 1 of the drawings, the round bale forming machine of this invention, indicated generally at 10, is shown in assembly relation with a farm tractor 11 having rear traction wheels 12 and a rear drawbar 13. The baling machine 10 is shown as being of a pull type and includes a portable frame 14 (FIG. 2) having a base section 16 of a generally U-shape open at its rear end and having a forwardly projected tongue structure 17 connected by a hitch pin 18 with the drawbar 13. The base section 16 is supported on a pair of rear ground wheels 19 corresponding to and rotatably supported on side or leg members 21 of the base section 16.

Projected upwardly from each of the side members 21 is a series or set of three longitudinally spaced upright support members 22, 23 and 24 (FIG. 2). For convenience, the upright members 22 shall be referred to as the rear upright members; the members 23 as intermediate upright members; and the members 24 as front upright members. The upper portions of each series or set of the members 22, 23 and 24 are secured together by an associated longitudinally extended brace member 26.

A pair of rearwardly and downwardly extended pivoted arms 27 (FIGS. 1 and 2) have their upper forward ends supported on pivot shafts 28 carried on the intermediate upright members 23. The lower rear ends of the pivoted arms 27 are pivotally movable up and down relative to the rear ends of the side members 21 to a lower position limited by their engagement with the side members 21 and to an elevated position projected in a substantially horizontal plane rearwardly from the intermediate upright members 23. The pivoted arms 27 are raised and lowered by associated hydraulic cylinder assemblies 29 (FIG. 2), each of which extends between and is connected to a corresponding intermediate upright member 23 and a pivoted arm 27. A wheel shaft 31 for each of the ground wheels 19 is rotatably supported in a bearing unit (not shown) mounted adjacent the lower end of a corresponding rear upright member 22.

A material pickup device 33 (FIGS. 2 and 4) extended transversely between the rear ends of the pivoted arms 27 includes a cylindrical body member 34 having an axially extended shaft 36 with projected end portions 35 rotatably supported on and adjacent to the rear ends of the pivoted arms 27. Material pickup members 37 of a generally triangular shape in side elevation are arranged in circumferential rows spaced axially of the body member 34. For a more detailed description of the pickup device 33, reference is made to U.S. Pat. No. 3,815,344.

The pickup device 33 is operated from the ground wheels 19 by a pair of like ground driven power transmission systems 38 (FIGS. 2 and 3). Since each power transmission system 38 is of a like construction, and similar in operation, only one thereof will be described in detail with corresponding numbers being applied to like parts. A power transmission system 38 includes a drive sprocket 39 mounted on the shaft 31 of a ground wheel 19 at a position inwardly of a side member 21. Each projected end 35 of the pickup shaft 36 extends through and laterally outwardly from an associated pivoted arm 27. A sprocket gear 41 mounted on a shaft end 35 outwardly of the corresponding pivoted arm 27 is arranged in a plane substantially common to the plane of the drive sprocket 39. An idler sprocket 42 is supported on a pivoted arm 27 at a position forwardly of a sprocket gear 41 such that the gears 41 and 42 are to opposite sides of a drive sprocket gear 39 when the pivoted arm 27 is in its lower position. A sprocket chain 43 trained about the sprockets 41 and 42 has a lower run portion 40 engageable with the drive sprocket 39 when the pivoted arm 27 is moved to lower the pickup device 33 to its pickup position. The gears 39 and 41 are of a relative size to provide for the peripheral speed of the pickup device 33 being substantially equal to the linear speed of forward travel of the portable frame 14.

Located between the intermediate upright members 23 and front upright members 24 for rotatable support on the side members 21 is a fixed front bottom transverse roller 44 (FIG. 2). The pickup device 33 and the front bottom roller 44 are spaced a distance apart to receive therebetween a completed bale, indicated at 45 in FIGS. 4 and 5. Stated otherwise, the area enclosed by the pickup device 33, the front bottom roller 44 and the side members 21 defines a baling zone for the bale 45 being formed.

A fixed front upper roller 46 (FIG. 2) extends transversely between and is rotatably supported adjacent the upper ends of the front upright members 24 so as to be located upwardly and forwardly from the front bottom roller 44. Positioned between and rotatably supported adjacent the upper ends of the rear upright members 22 are a pair of fixed rollers 47 and 48. The upper one 47 of the rollers 47 and 48 is located above the level of the longitudinal connecting members 26 and the lower one 48 of such rollers is located substantially in the plane of the connecting members 26. A transversely extended movable roller 49 (FIGS. 2 and 4) extends between and is rotatably supported at the free or upper ends 51 of a pair of pivoted arm members 52 arranged to the outer sides of the upright members 23 and 24. The lower ends of the pivoted arms 52 are pivotally supported on the pivot shafts 28 of the arms 27.

When the pickup device 33 is in its lower pickup position, the pivoted arms 52 extend upwardly and forwardly in substantial longitudinal alignment with the pivoted arms 27 (FIGS. 1 and 2) and are of a length such that the movable roller 49 is above the connecting members 26 at a position forwardly of the fixed upper front roller 46. The roller 49 is thus pivotally movable longitudinally of the frame 14 in a path above the connecting members 26 to provide for the extension of the lower runs 64, of roller supported belts 57, about the upper peripheral portion of a bale being formed. The pivoted arms 52 and in turn the movable roller 49 are continuously and yieldably urged in a direction toward the front end of the frame 14 by a pair of coil springs 53 arranged at opposite sides of the frame 10 and connected in tension with an associated pivoted arm 52 and the front end 54 of a corresponding connecting member 26. As best appears in FIGS. 2 and 4, the front end 54 of a connecting member projects forwardly of an adjacent front upright member 24. As will appear later, the movable roller 49, pivot arms 52 and springs 53 constitute a belt tensioning device 56. Thus, by varying the tension of the springs 53, the compaction or density of a bale may be varied.

The tensioning device 56 maintains under tension a plurality of flexible members or flat belts 57 that are spaced transversely of the frame 10 in operative association with the rollers 44, 46, 47, 48 and 49 and the pickup device 33. The belts are driven in an upright path longitudinally of the frame 14 by the pickup device 33 and the front bottom roller 44 which functions as a drive roller. Each projected end of the shaft 59 for the bottom drive roller 44 carries a sprocket 61. Each intermediate upright member 23 supports sprockets 62 and 63, with a sprocket 62 being rotatable on the pivot shaft 28 at a position above a sprocket 63. The associated sprockets 61, 62 and 63 are arranged substantially in the plane of a corresponding drive sprocket 39.

Each continuous sprocket chain 43 (FIG. 3) from the pickup sprocket 41 is trained over the idler sprockets 42 and 62 for travel downwardly about the roller drive sprocket 61, upwardly over the idler sprocket 63 and under the sprockets 42 and 41 for return to the pickup drive sprocket 41. The belts 57 are driven when the pivoted arms 27 are in their lower positions providing for the engagement of the wheel sprockets 39 with the lower run portions 40 of the chains 43.

When a bale 45 is to be formed, the pickup device 33 (FIGS. 1 and 2) is in its lower position wherein the belts 57 are trained about the body member 34 of the pickup device 33 at positions between the circumferential rows of the pickup members 37. At the start of a baling operation, the lower runs 64 of the belts 57 extend upwardly and forwardly between the pickup device 33 and the front bottom roller 44 adjacent to the ground surface and in turn to the windrowed fibrous materials that is to be baled. During the baling operation, and as shown in FIGS. 4 and 5, the lower belt runs 64 extend upwardly between the pickup device 33 and the bottom roller 44 for engagement with the upper peripheral portion of the bale being formed. This extension of the belt lower runs 64 is permitted by the progressive yieldable rearward movement of the pivoted arms 52 of the tensioning device 56, from their positions, shown in FIG. 2, to the positions thereof, shown in FIGS. 4 and 5.

When a bale being formed is rolled along the ground surface, difficulty is usually encountered in operating the machine during turning movements which occur frequently during a baling operation. This results from the size of the bale, the length of which may vary from four to six feet with a diameter of about five feet while obtaining a weight of from a thousand pounds to a ton and the necessity of bale slippage at one end relative to the other end thereof during a turning movement. This relative slipping movement requires increased drive power and in the case of a ground driven machine, generally results in the ground wheels becoming locked.

This difficulty is overcome in the present invention by the provision of a cradle mechanism or unit, indicated generally as 66 (FIGS. 4 and 6) and including a rock shaft 67 coextensive in length with the front bottom roller 44 and rotatably supported thereabove on mounting brackets 69 in a parallel relation with the roller 44. A plurality of elongated tine members 71, illustrated as three in number, project downwardly and forwardly from the rock shaft 67 with their front ends 72 located adjacent the forward side of the pickup device 33. The rear end portions 70 of the tines are of a curvature corresponding substantially to the peripheral curvature of a bale, and the intermediate portions 75 thereof are substantially linear to provide for the support thereon of a fully formed bale.

During a bale forming operation, the intermediate tine portions 75 are lowered to positions in riding engagement on the top surface of the windrowed material, which is indicated at 74 (FIG. 4), so that the bale 52 being formed may be rotated jointly on the tine portions 75 and the ground surface.

In a turning movement, the tines 71 are rocked upwardly and rearwardly to elevate the bale 45 out of engagement with the ground surface to a fully supported position on the machine frame 14. Relative slipping movement between the ends of the bale during a turning movement is thus eliminated; since the bale rotation is free of the ground and any slipping movement occurs between the bale, the tines 71 and the belts 57. Traction on the ground wheels 19 during a turning movement is also increased due to the support thereon of the full weight of the bale. The baling operation in a turn thus remains continuous by virtue of the bale being rotated in a supported position on the tines. In this respect, it is seen that the support of a bale on the tines 71 may take place during an entire baling operation. During such operation it is apparent that the lifting of a bale on the tines against the downward compaction pressure applied by the belts 57 acts jointly with the belts to increase bale compaction and density.

After a baling operation has been initiated with the tines 71 riding on the ground surface, the bale, for traction purposes, may be elevated on the tines for full support on the machine frame 14. In any event, on completion of the formed bale 45, it may be discharged in the field by merely pivoting the arms 27 to the discharge positions therefor and advancing the machine; or the bale may be elevated to a supported position on the tines 71 and transported on the machine to a storage or feeding location. During transport, it is only necessary that the pivoted arms 27 be moved to positions wherein the portions 40 of the sprocket chains 43 are disengaged from the wheel drive sprockets 39.

For rocking the shaft 67 to elevate or lower the tines 71, each end of the rock shaft carries a rearwardly projected rock arm 76 (FIGS. 6 and 7), the rear or free end of which is in a lost motion connection 77 with the piston rod 78 of a hydraulic cylinder 79, the head end 81 of which is pivotally supported at 82 on a mounting arm 83 carried on and projected forwardly of a front upright member 24. A coil spring 84 is connected in tension with an associated rock arm 76 and a corresponding side member 21 of the frame 14 to yieldably urge the tines 71 upwardly to a stop position defined by the lost motion mechanism 77 and a retracted position of the rod 78. Thus, when the piston rod 78 is in its retracted position, the springs 84, in cooperation with the lost motion connection 77, permit the tines 71 being yieldably movable from the position slightly elevated above the ground surface to a ground or windrowed engaging position. With the piston rod 78 retracted, the tines 71 would initially be in yieldable engagement with the top surface of the windrowed material being baled and as the baling operation progressed would be moved into pressing engagement against the windrowed material against the action of the springs 84. During this movement, and as shown in FIG. 7, pins 85 at the rear ends of the rock arms 76 would move upwardly, in a lost motion relative to the lower end of the piston rod 78, to stop positions against the upper ends of slots 86 formed in a clevis 87 mounted on the terminal end of the piston rod 78.

On extension of the piston rod, the rock arms 76 are moved downwardly and forwardly to in turn provide for an upward and forward movement of the tines 71 into elevating engagement with the bale 45 being formed. The cylinder assemblies 78–79 are of a usual double acting type with fluid under pressure being supplied thereto in a usual manner from a hydraulic system with which a farm tractor is generally equipped.

In an axially spaced relation with the elongated tines 71 on the rock shaft 67 are a plurality of short tines 88 of a length and shape corresponding substantially to the length and shape of the rear end portions 70 of the tines 71 and with a tine 88 being adjacent each end of the shaft 67. The tines 71 and 88 are of a number to be received between adjacent ones of the belts 57 to function as guides for the belt lower runs 64. Importantly, the tines 71 and 88 substantially eliminate any wrapping of the windrowed material about the front bottom roller 44. Thus, in the rotation of the bale 45, any loose hay on the peripheral surface thereof tends to follow the belts 57 for travel about the roller 44. However, with the tines 71 and 88 positioned between adjacent belts 57, such loose hay is removed from the belts by the tines for continued rotation and wrapping about the bale 45 being formed.

Although the invention has been described with respect to preferred embodiment thereof, it is to be understood that it is not to be so limited since changes and modifications can be made therein within the full intended scope of the invention as defined in the appended claims.

I claim:

1. A machine for removing crop material from the ground and rolling it along the ground to form a cylindrical bale comprising:
    (a) a mobile frame having a pair of upright transversely opposite frame structures,
    (b) a rotatable material pickup means extended transversely between said opposite frame structures adjacent the rear end of the mobile frame,
    (c) endless flexible means,
    (d) means supporting said endless flexible means on said frame structures for movement in an upright path longitudinally of said mobile frame, said endless flexible means including a lower run portion extended upwardly and forwardly from said pickup means and movable in a forward direction to engage and roll the material gathered by the pickup means,
    (e) a transverse cradle unit extended between said frame structures adjacent the front end of said lower run portion, said cradle unit including a plurality of transversely spaced arcuate tine members projected rearwardly and downwardly for termination adjacent the forward side of said pickup means,
    (f) means pivotally supporting said cradle unit on said frame structures for up and down pivotal movement of said tine members, and
    (g) means for pivotally moving the cradle unit from a lower position wherein the tine members are adjacent the ground surface and beneath a bale, to an upper position wherein a completed bale is supported on the tine members for transport on the mobile frame.

2. The machine according to claim 1, including:

(a) means movably mounting said material pickup means on said frame structures for movement from a lower material pickup position adjacent the rear lower end portions of said frame structures to an elevated bale discharge position providing for the passage thereunder of a completed bale, (b) ground wheels for said portable frame, (c) coacting means on the mounting means of said pickup device and on at least one of said ground wheels releasably connectible to connect said pickup device in a driven relation with said one ground wheel, (d) said coacting means being connected when the pickup device is in the lower position therefor, and released when the pickup device is moved out of the lower position toward the elevated position therefor.

3. The machine according to claim 2, wherein:

(a) said cradle unit is movable from the lower position therefor toward the upper position therefor to vary the weight of a bale carried on said mobile frame whereby to control the tractive action of said ground wheel with the ground surface.

4. The machine according to claim 2, wherein:

(a) said movable mounting means includes a pair of pivoted lift members corresponding to said frame structures, (b) means pivotally supporting the forward end of each lift member on an associated frame structure, (c) means rotatably supporting said pickup device at the rear ends of said lift members, (d) said coacting means including a sprocket member rotatable as a unit with said one ground wheel, and a pair of gear members spaced longitudinally on the lift member adjacent said one ground wheel a distance apart such that when the pickup device is in the lower position therefor, said pair of gear members are arranged to opposite sides of said sprocket member, with one of said gear members rotatable as a unit with pickup device, and (e) an endless chain for connecting said pair of gears having a portion thereof engageable with the sprocket gear when the pickup device is in said lower position therefor.

5. The machine according to claim 4, wherein:

(a) said one gear member and sprocket member are of a relative size to provide for the pickup device being rotated at a peripheral speed substantially equal to the forward speed of the mobile frame.

6. A machine for removing crop material from the ground and rolling it along the ground to form a cylindrical bale comprising:

(a) a mobile frame having a pair of upright transversely opposite frame structures, (b) a rotatable material pickup means extended transversely between said opposite frame structures adajcent the rear end of the frame, (c) endless flexible means on said frame movable in an upright path longitudinally of the frame, (d) means supporting said endless flexible means on said frame including a transverse lower roller mounted on and extended between said opposite frame structures at a position spaced forwardly of the pickup means, said endless flexible means having a lower run portion between said pickup means and lower roller movable in a forward direction to engage and roll the material gathered by the pickup means, (e) a transverse cradle unit including a rock shaft extended between and movably mounted on said frame structures above said bottom front roller, (f) a plurality of transversely spaced tine members on said rock shaft projected rearwardly and downwardly from said rock shaft for termination of the rear ends thereof adjacent the forward side of the pickup device, and (g) means on said mobile frame for adjustably moving said rock shaft between ground engaging positions and elevated positions of said tine members.

7. A machine according to claim 6, wherein:

(a) said endless flexible means comprises a plurality of belts spaced transversely between said frame structures, and (b) means including said tine members are projected between adjacent ones of said belts to guide the travel of said belts about said lower roller.

8. A machine according to claim 6, wherein:

(a) each said tine member has a rear section of an arcuate shape conforming substantially to the shape of the peripheral portion of a bale being formed, and a linear front section positionable beneath a bale, and (b) means coacting with said rock shaft moving means to yieldably support said front sections in floating engagement with the ground surface in the lower position of said tine members.

* * * * *